(12) United States Patent  
Kibune et al.

(10) Patent No.: US 9,118,451 B2
(45) Date of Patent: Aug. 25, 2015

(54) RECEIVER CIRCUIT AND RECEIVING METHOD

(71) Applicant: FUJITSU LIMITED, Kawasaki-shi, Kanagawa (JP)

(72) Inventors: Masaya Kibune, Machida (JP); Hirotaka Tamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/189,840

(22) Filed: Feb. 25, 2014

(65) Prior Publication Data

US 2014/0376675 A1 Dec. 25, 2014

(30) Foreign Application Priority Data

Jun. 19, 2013 (JP) ................................. 2013-128527

(51) Int. Cl.
*H04L 7/00* (2006.01)

(52) U.S. Cl.
CPC ...................... *H04L 7/0087* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00; G11B 20/00; G11B 3/00
See application file for complete search history.

(56) References Cited

U.S. PATENT DOCUMENTS

| 4,475,220 | A  | * | 10/1984 | Mattei et al. | .................. | 375/332 |
| 7,295,601 | B1 | * | 11/2007 | Sinha et al. | .................. | 375/222 |
| 2014/0039823 | A1 | * | 2/2014 | Raghupathy et al. | ........... | 702/94 |

FOREIGN PATENT DOCUMENTS

JP 2004-312292 A 11/2004

OTHER PUBLICATIONS

Ting, et al., "A Blind Baud-Rate ADC-Based CDR," ISSCC 2013, Session 7, Optical Transceivers and Silicon Photonics, 7.4, pp. 122-124.

* cited by examiner

*Primary Examiner* — Adolf Dsouza
(74) *Attorney, Agent, or Firm* — Arent Fox LLP

(57) ABSTRACT

A receiver circuit includes: an input ADC configured to convert an input data signal to sample data in accordance with a clock; a boundary phase computation circuit configured to determine the boundary phase of the input data signal based on the sample data; an eye pattern computation circuit configured to compute a maximum amplitude phase of an eye pattern of the input data signal based on the sample data and the boundary phase; and a determination circuit configured to determine a value of the input data signal in the maximum amplitude phase based on the sample data and the maximum amplitude phase.

14 Claims, 8 Drawing Sheets

FIG. 6A
$$b \cdot (1-\phi_{AVG}) + c \cdot \phi_{AVG} + 0.5((b-a) - (d-c)) \cdot \phi_{AVG} \cdot (1-\phi_{AVG})$$
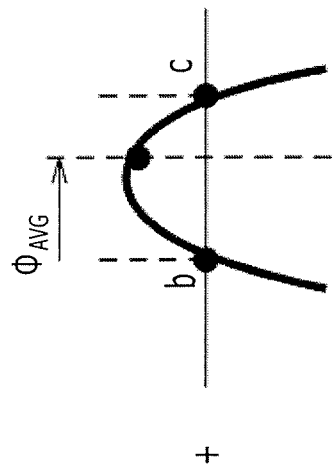
FIG. 6D
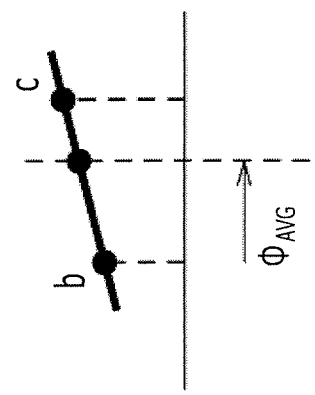
FIG. 6C
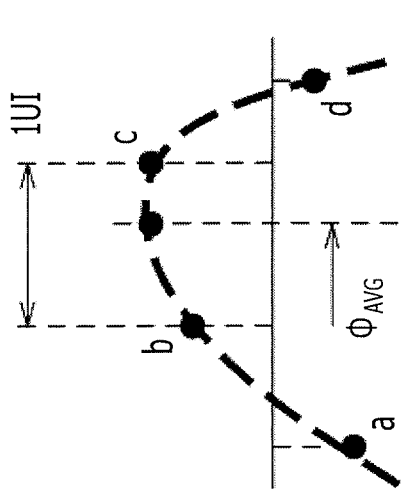
FIG. 6B

FIG. 7A
$$b \cdot (1-\Phi_{AVG}) + c \cdot 1-\Phi_{AVG} + 0.5((b-a) - (d-c)) \cdot L(\Phi_{AVG})$$
$$L(\Phi_{AVG}) = \begin{cases} 0.5 \cdot \Phi_{AVG} & \text{when } 0 \leq \Phi_{AVG} < 0.5UI \\ -0.5 \cdot (1-\Phi_{AVG}) & \text{when } 0.5 \leq \Phi_{AVG} \leq 1UI \end{cases}$$
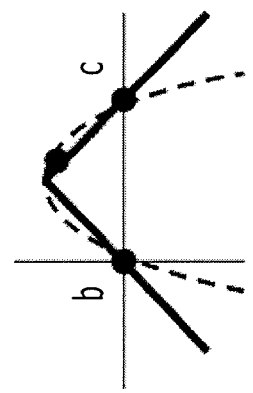
FIG. 7B
≈
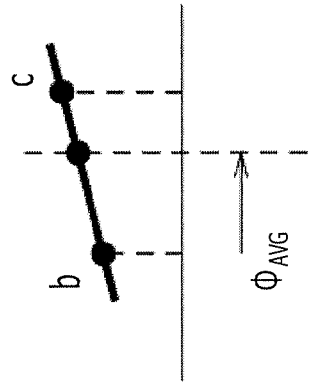
FIG. 7C
+
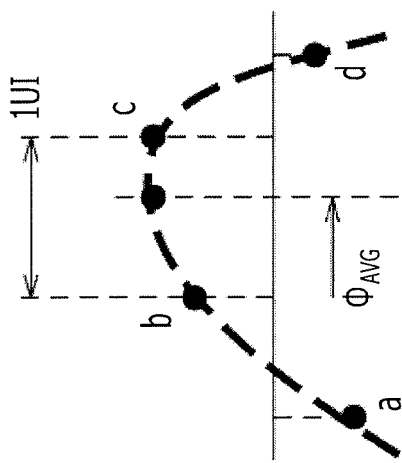
FIG. 7D

RECEIVER CIRCUIT AND RECEIVING METHOD

CROSS-REFERENCE TO RELATED APPLICATION

This application is based upon and claims the benefit of priority of the prior Japanese Patent Application No. 2013-128527, filed on Jun. 19, 2013, the entire contents of which are incorporated herein by reference.

FIELD

The embodiments discussed herein are related to a receiver circuit and to a receiving method.

BACKGROUND

It is demanded that the speed of signal transmission between LSI chips or a plurality of circuit blocks within housings and between the housings be increased.

A related art is disclosed in Japanese Laid-open Patent Publication No. 2004-312292 or in C. Ting, et al., "A Blind Baud-Rate ADC Based CDR", ISSCC 2013, Session 7, Optical Transceivers and Silicon Photonics, 7.4.

SUMMARY

According to an aspect of the embodiments, a receiver circuit includes: an input ADC configured to convert an input data signal to sample data in accordance with a clock; a boundary phase computation circuit configured to determine the boundary phase of the input data signal based on the sample data; an eye pattern computation circuit configured to compute a maximum amplitude phase of an eye pattern of the input data signal based on the sample data and the boundary phase; and a determination circuit configured to determine a value of the input data signal in the maximum amplitude phase based on the sample data and the maximum amplitude phase.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A illustrates an example of an interpolation arithmetic expression;

FIGS. 6B to 6D illustrate an example of a interpolation computation;

FIG. 7A illustrates an example of an interpolation arithmetic expression;

FIGS. 7B to 7D illustrate an example of a interpolation computation; and

DESCRIPTION OF EMBODIMENT

For improvement of system performance, it may be demanded that the performance of a memory, a processor, a switching LSI part, or the like and the speed of signal transmission between such parts be enhanced (an increase in a transmission capacity measured in bits per second and a decrease in the latency of transmission may be demanded). For example, an increase in the rate of signal transmission between a processor and memories, such as an SRAM and a DRAM, improves the performance of a computer (server). For servers and other devices, it is demanded that the data rate of intra-device and inter-device signal transmission/reception be increased in accordance with the improvement of performance of information processing devices such as communication backbone devices.

Data rates of I/Os of many integrated circuits may increase to a level between several gigabits per second and tens of gigabits per second in order to meet a demand for data rate enhancement. In a high-performance device, a large number of I/O ports having such a high data rate may be integrated into a single integrated circuit. High-speed I/Os include many analog circuits such as an amplifier circuit, an equalizer, or a timing generator circuit. However, the analog circuits may be replaced by digital circuits in order to provide increased ease of design and integrate many I/Os.

An input data signal, for example, received data, may be converted to digital data by an analog-to-digital converter and subjected to signal processing, such as equalization and timing generation, by digital circuits. A receiver circuit having the analog-to-digital converter reduces process variations or operating-temperature-induced changes in characteristics. Further, design productivity may be high because signal processing is mainly performed by the digital circuits. For example, the receiver circuit determines the phase relationship between a clock signal and received data from sample data that is sampled with a certain clock signal. In accordance with the determined phase relationship, the value of the received data in an optimum phase for distinguishing between 0 and 1 is interpolation-calculated and generated. Consequently, the value of the received data is determined in an appropriate phase even if a phase adjustment circuit having an analog-circuit-based clock generator circuit is not used.

Interpolated data of the received data is calculated on the assumption that the optimum phase for distinguishing between 0 and 1 is a phase shifted by a ½ unit interval (UI) from a transition timing at which the received data passes through an intermediate level. The optimum phase may not be the phase shifted by a ½ UI depending on the characteristics of an employed transmission line. The value of the received data, which is calculated in the phase that is shifted by a ½ UI, may not be an optimum value. Hence, the degradation of an error rate (BER) or a decrease in an operating speed may result.

Figure 1:
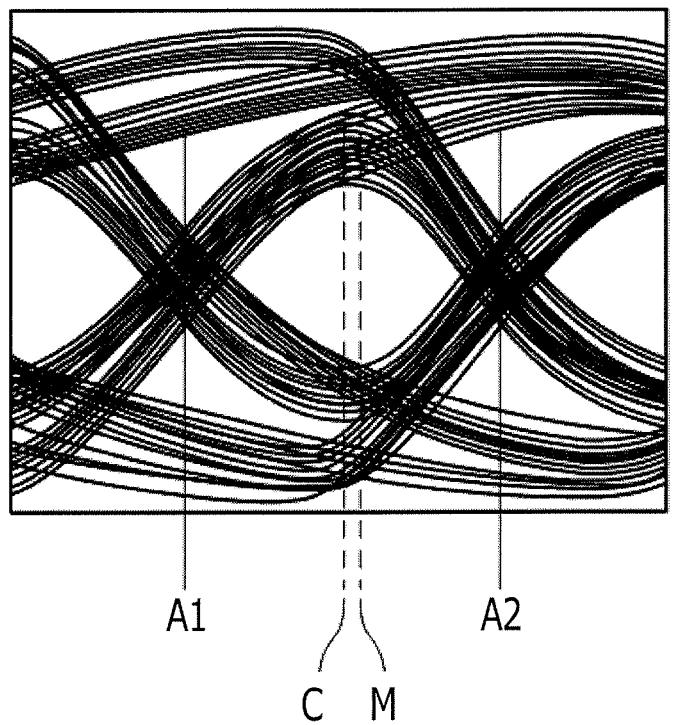
FIG. 1 illustrates an example of a waveform of a differential data signal.

FIG. 1 illustrates an example of a waveform of a differential data signal. In FIG. 1, the waveform of the differential data signal input from the transmission line is depicted. The waveform depicted in FIG. 1 may be referred to as an eye pattern. The receiver circuit receives the data signal depicted in FIG. 1 as the received data, distinguishes between 0 and 1, and acquires the received data.

Referring to FIG. 1, phases depicted at A1 and A2 represent a transition timing at which the differential data signal crosses the intermediate level and are referred to as a boundary phase. A phase depicted at C is an intermediate phase of a neighboring boundary phase, for example, a phase shifted by a ½ unit interval (UI) from a boundary phase. A phase depicted at M is a maximum amplitude phase in which the amplitude of the differential data signal is maximized. The optimum phase for distinguishing between 0 and 1 may be the phase depicted at C in FIG. 1.

Figure 2:
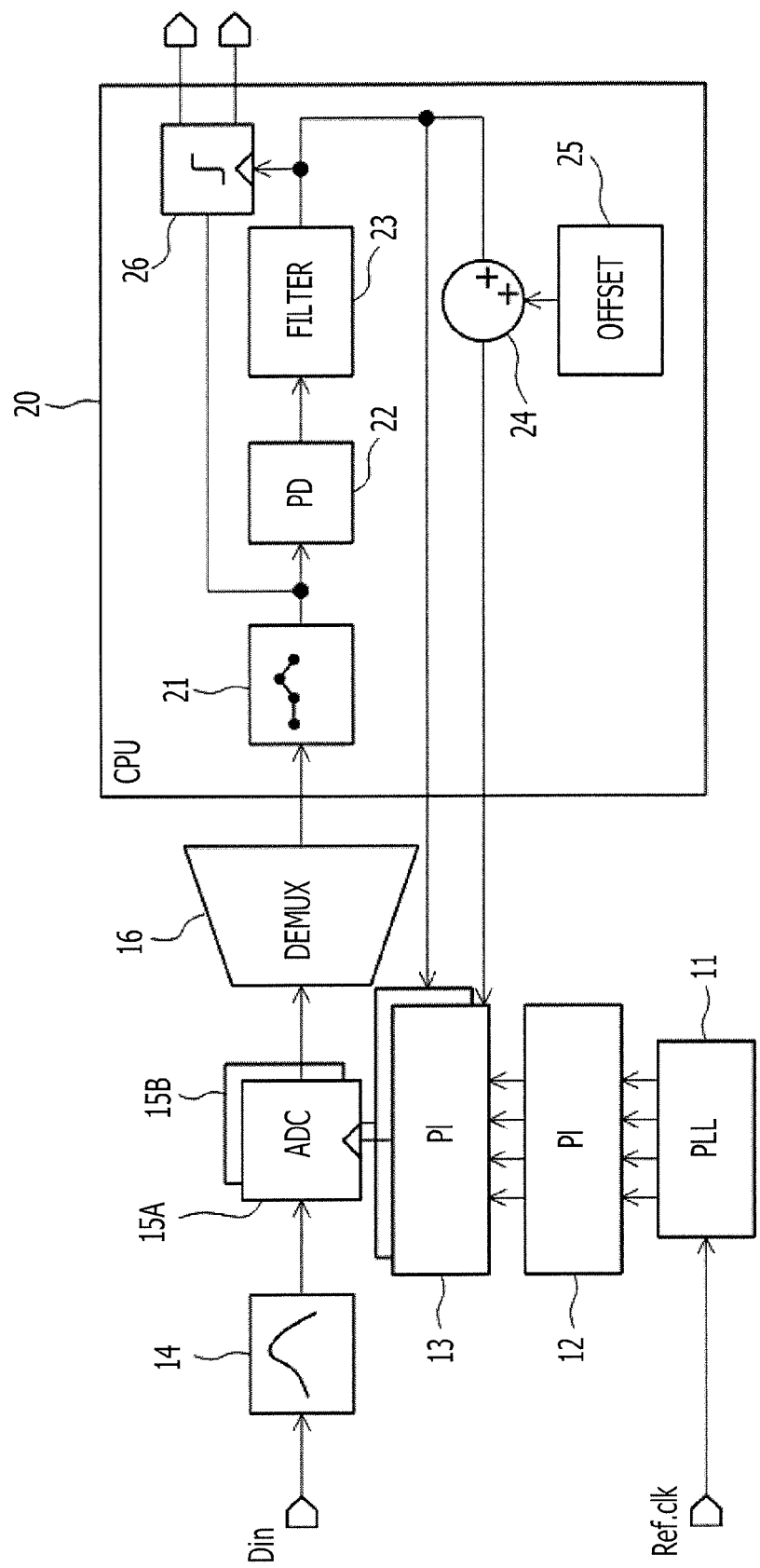
FIG. 2 illustrates an example of a receiver circuit.

FIG. 2 illustrates an example of a receiver circuit. In the receiver circuit depicted in FIG. 2, a tracking clock and data recovery (CDR) operation is performed while a phase shifted by a ½ UI from the boundary phase is regarded as the optimum phase.

The receiver circuit depicted in FIG. 2 includes a PLL circuit 11, a first phase interpolator (PI) 12, a second phase interpolator (PI) 13, an analog equalizer circuit 14, analog-to-digital converters (ADC) 15A, 15B, a demultiplexer (DE-MUX) 16, and a clock recovery unit (CRU) 20. The PLL circuit 11 generates four phase clock signals from a reference clock signal Ref. clk. The four phase clock signals, which are used for reception, are shifted by a ½ UI from each other. The first PI 12 fine-adjusts the phases of the four phase clock signals output from the PLL circuit 11 and generates four phase reception clock signals. The PLL circuit 11 and the first PI 12 may be integrally formed.

In accordance with a boundary code and data code output from the CRU 20, the second PI 13 generates, from the four phase reception clock signals, a clock signal and ½ UI shift clock signal that agree with the boundary of the received data Din.

The analog equalizer circuit 14 performs analog processing so as to equalize the input data signal Din. The ADC 15A samples the output of the analog equalizer circuit 14 in synchronization with the clock signal that agrees with the boundary output from the second PI 13, and converts the sampled output to boundary sample data. The ADC 15B samples the output of the analog equalizer circuit 14 in synchronization with the ½ UI shift clock signal output from the second PI 13, and converts the sampled output to ½ shift sample data. The above circuits may be analog processing circuits.

The DEMUX 16 converts the output of the ADCs 15A, 15B to parallel data. The CRU 20 includes a digital equalizer circuit 21, a phase detector (PD) 22, a filter 23, an adder circuit 24, an offset register 25, and a decision circuit (comparator) 26.

The digital equalizer circuit 21 performs digital processing so as to equalize sample data received from the DEMUX 16. The PD 22 detects difference data, which corresponds the phase difference between a boundary clock signal and the input data signal, from the sample data. The filter 23 performs averaging processing on the difference data of the PD 22 and outputs a boundary code in order to reduce a timing error. The adder circuit 24 adds an offset value that is stored in the offset register 25 and corresponds to a ½ shift amount to the boundary code, and outputs a data code. The decision circuit 26 checks whether the ½ shift sample data included in the output from the digital equalizer circuit 21 is greater than a reference value, determines the value of the input data signal, and recovers the data.

The receiver circuit depicted in FIG. 2 performs a tracking operation to vary the phase of a received clock signal in accordance with the transition timing of the waveform of a received input data signal. The CRU 20 detects the boundary phases (transition timings) A1, A2 depicted in FIG. 1 in accordance with received data, and generates a boundary code for generating a boundary clock signal having a rising edge at a transition timing. An offset code corresponding exactly to a ½ UI phase shift is added to the boundary code to generate a data code for generating a data sampling phase shift clock. The second PI 13 generates a sampling clock having an arbitrary phase in accordance with the data code.

As mentioned above, if a clock signal subjected to a ½ UI phase shift is not in an optimum sampling phase, an offset amount may be set to a value different from a ½ UI phase shift amount. For example, an optimum offset amount may be determined during a period during which no actual operation is performed, for example, during a period of initialization, and stored as a fixed value. If, for instance, the phase of a data sampling clock is adjusted during an actual operation, the deviation from the optimum phase may become significant to cause an error.

Figure 3:
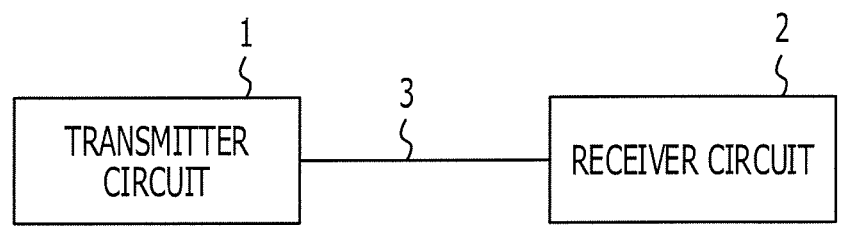
FIG. 3 illustrates an example of a communication system.
Figure 4:
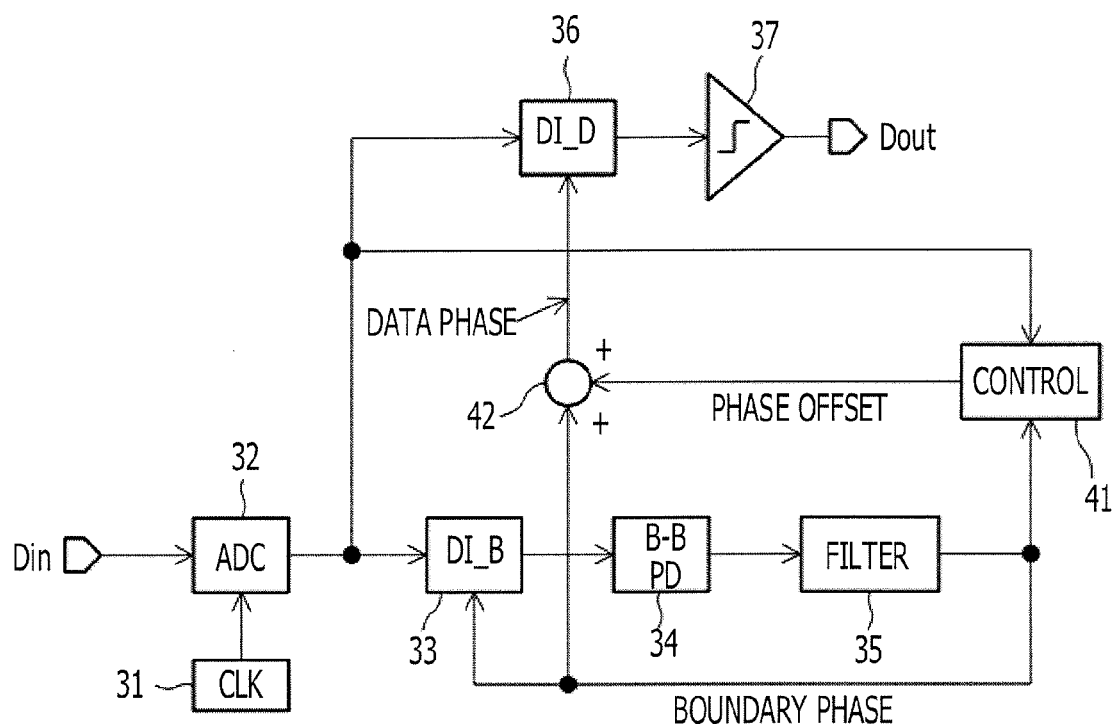
FIG. 4 illustrates an example of a receiver circuit.

FIG. 3 illustrates an example of a communication system. The communication system depicted in FIG. 3 includes a transmitter circuit 1, a receiver circuit 2, and a communication path 3. FIG. 4 illustrates an example of the receiver circuit. The receiver circuit depicted in FIG. 4 may be the receiver circuit depicted in FIG. 3. The receiver circuit 2 depicted in FIG. 4 includes a clock source (clk) 31, an ADC 32, a DI_B 33, a B-B PD 34, a filter 35, a DI_D 36, a comparator 37, a control circuit 41, and an adder circuit 42. Similarly to the case with the receiver circuit depicted in FIG. 2, in the receiver circuit depicted in FIG. 4, an input section for receiving the data signal Din is provided, for instance, with a preamplifier or an analog equalizer circuit (equalizer), and an input data signal subjected to waveform processing is input to the ADC 32.

The clock source (clk) 31 outputs a sampling clock signal that is to be used for reception processing. The frequency of the sampling clock signal may be approximate to that of the input data signal (received data) and irrelevant to the timing of the received data. For example, the receiver circuit depicted in FIG. 4 may be referred to as a blind CDR type receiver circuit.

Figure 5:
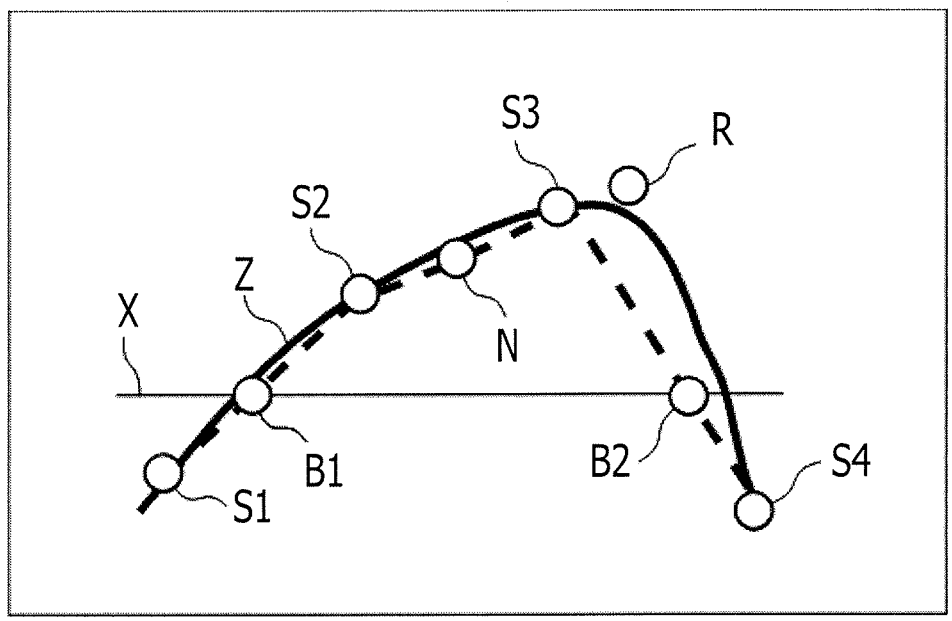
FIG. 5 illustrates an example of a blind CDR method.

FIG. 5 illustrates an example of a blind CDR method. In FIG. 5, the reference character Z denotes the waveform of an input data signal, and the reference character X denotes a signal's intermediate level. The reference characters S1 to S4 denote ADC sample data that are obtained when the received data is sampled. The reference characters B1 and B2 denote transition data computed from the ADC sample data. The ADC sample data S1 and S2 existing on a respective side of the intermediate level are linearly interpolated so that data in the boundary phase A1 is determined as the transition data B1. The transition data B1 may be a value that prevails when the differential data signal crosses. In FIG. 5, the transition data B1 may agree with the intermediate level X. For example, the ADC sample data S3 and S4 are also linearly interpolated so that data in the boundary phase A2 is determined as the transition data B2. The reference character N may denote data that is estimated, by linearly interpolating the ADC sample data S2 and S3, as a value in the intermediate phase between the boundary phases A1 and A2, for example, as a value in a ½ UI shifted phase. The estimated data N may be regarded as the value of the received data and subjected to a process of distinguishing between 0 and 1.

As depicted in FIG. 5, the estimated data N is an estimated value in the intermediate phase between the boundary phases A1 and A2, but is smaller than the maximum amplitude of an input data signal Z.

For example, in the receiver circuit depicted in FIG. 4, data corresponding to the maximum amplitude of the eye pattern of the input data signal Z, which is depicted at R, is estimated and set as the value of the input data signal. The data R may be estimated by using the ADC sample data S1 to S4 and by using information about the boundary phase of the transition data B1 and B2. For example, the maximum amplitude and phase are determined by sequentially performing data estimation based on quadratic interpolation and data estimation based on linear interpolation that provides extrapolation on a phase in which the maximum amplitude is expected to occur in accordance with the values of the ADC sample data S2, S3, S4 and the boundary phase of the transition data B2. The receiver circuit depicted in FIG. 4 may use the blind CDR method. In the receiver circuit depicted in FIG. 4, the phase of an ADC sampling clock signal is not feedback-controlled; therefore, a slight delay in the interpolation processing may not cause a problem. As interpolation processing is digitally performed, the use of a simple circuit may result in reducing the latency of transmission.

The blind CDR method makes it possible to calculate received data in an arbitrary phase from an ADC output without changing a sampling clock phase. Therefore, the blind CDR method may differ from a tracking CDR method.

In the receiver circuit, an interpolation process may be performed to estimate data between a plurality of sample data. FIG. 6A illustrates an example of an interpolation arithmetic expression. FIGS. 6B to 6D illustrate a example of interpolation computation.

An interpolation computation section interpolation-computes the received data in an arbitrary phase $\phi AVG$ based on the phase $\phi AVG$ and a series of sample data a-d output from the ADC 32, for example, based on the interpolation arithmetic expression depicted in FIG. 6A. In the interpolation arithmetic expression depicted in FIG. 6A, the first and second terms relate to linear interpolation, and the third term relates to quadratic interpolation. FIG. 6B illustrates the overall interpolation provided by the interpolation arithmetic expression depicted in FIG. 6A. FIG. 6C illustrates the linear interpolation. FIG. 6D illustrates the quadratic interpolation. If, for instance, the linear interpolation depicted in FIG. 6C is combined with the quadratic interpolation depicted in FIG. 6D, the overall interpolation depicted in FIG. 6B may be obtained.

The broken line in FIG. 6B indicates an actual waveform. The phase $\phi AVG$, which represents a position between the sample data b, c, is indicated by the ratio of the distance from the sample data b to a 1 UI. For quadratic interpolation depicted in FIG. 6D, the sample data a and d, which are on respective side of the sample data b and c, may be used.

For example, performing higher-order interpolation may reduce the error between an interpolated value and the actual waveform indicated by the broken line in FIG. 6B. A spline function, a Bezier function, or the like may be used in the interpolation arithmetic expression. The use of a complex interpolation arithmetic expression may increase the size of the circuit due to an increase in the amount of calculation. For example, a quadratic interpolation arithmetic expression may be used.

The interpolation arithmetic expression depicted in FIG. 6A may be simplified. FIG. 7A illustrates an example of an interpolation arithmetic expression. FIGS. 7B to 7D illustrate an example of interpolation computation. In FIGS. 7A and 7B, the three terms in the interpolation arithmetic expression depicted in FIG. 6A are simplified and converted to linear interpolation.

Referring to FIG. 7A, $\phi AVG$ ($1\phi AVG$) of the three terms of the interpolation arithmetic expression depicted in FIG. 6A is replaced by a linear function that is $0.5 \phi AVG$ when $\phi AVG$ is close to the sample data b or $-0.5(1-\phi AVG)$ when $\phi AVG$ is close to the sample data c. As depicted in FIG. 7D, an extrapolation method may be used in such a manner that if $\phi AVG$ is close to the sample data b, its value is on the extension of the sample data a and b, and that if $\phi AVG$ is close to the sample data c, its value is on the extension of the sample data c and d.

Using the interpolation arithmetic expression depicted in FIG. 7A may reduce the size of a quadratic interpolation circuit and produce an interpolated value having a smaller error than when linear interpolation is performed by using only the sample data b and c.

The ADC 32 depicted in FIG. 4 samples the received data Din and converts it to sample data in synchronization with the sampling clock signal.

The DI_B 33 depicted in FIG. 4, which may be a digital interpolation processing section for a boundary, interpolates a plurality of sample data output from the ADC 32, and computes transition (boundary) data in a boundary phase fed back by the filter 35. The interpolation computation is performed to determine the boundary data by using a plurality of sample data including a pair of sample data that are adjacent to each other and existing on both sides of an intermediate level. The boundary data may be a value close to the intermediate level X depicted in FIG. 5. In the interpolation computation performed by the DI_B 33, data in the proximity of the intermediate level is interpolated from sample data existing on both sides of the intermediate level. Therefore, a linear interpolation process based on an interpolation method may be adopted and a quadratic interpolation process may be adopted.

The B-B PD 34, which may be a boundary phase detection circuit, determines relevant transition time (phase) from boundary data. The filter 35 computes the transition (boundary) phase of the waveform of the input data signal (received data) by determining the average value of the boundary phase from the B-B PD 34.

The computed boundary phase is fed back to the DI_B 33. The DI_D 36, which may be a digital interpolation processing section for data, interpolates sample data output from the ADC 32, and determines the data value of a data phase output from the adder circuit 42. The DI_D 36 may perform an interpolation computation based on a plurality of adjacent sample data in accordance by using the interpolation arithmetic expression depicted in FIG. 6A or 7A or by executing a higher-order interpolation process.

The comparator 37 checks whether the data value in the maximum amplitude phase, which is derived from the interpolation computation performed by the DI_D 36, is greater than a reference value, determines the value of the input data signal, and outputs the determined value as output data Dout.

The control circuit 41 calculates the degree of voltage waveform (eye pattern) opening in an arbitrary phase from the sample data output from the ADC 32 and the boundary phase output from the filter 35, and determines a phase offset $\theta 0(K)$ from which the maximum value (maximum amplitude) is obtained.

The adder circuit 42 adds the phase offset output from the control circuit 41 to the boundary phase output from the filter 35, and outputs a data phase that is the maximum amplitude phase.

Figure 8:
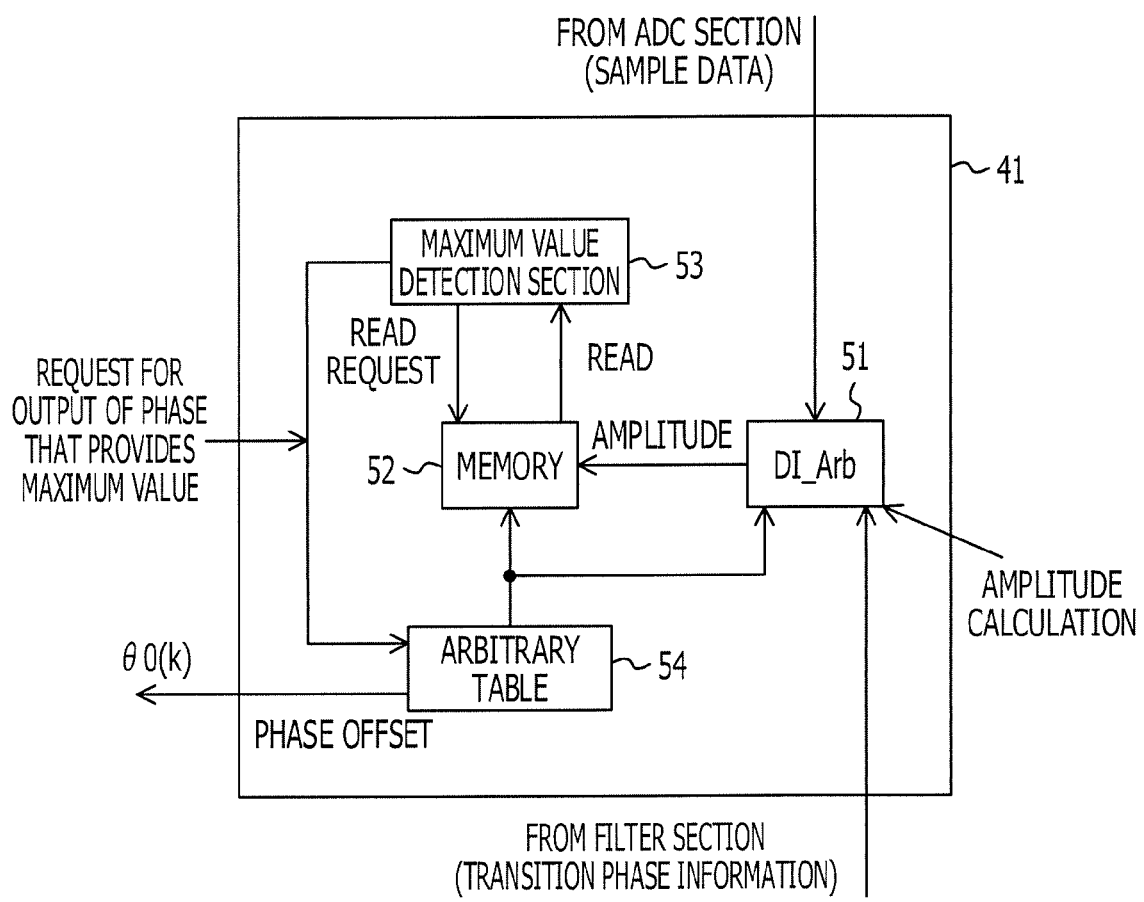
FIG. 8 illustrates an example of a control circuit.

FIG. 8 illustrates an example of a control circuit. The control circuit depicted in FIG. 8 may be the control circuit 41 depicted in FIG. 4. The control circuit 41 includes a DI_Arb 51, a memory 52, a maximum value detection section 53, and an arbitrary table 54.

The DI_Arb 51 performs interpolation processing by using the interpolation arithmetic expression depicted in FIG. 6A or 7A. The DI_Arb 51 computes data received in an arbitrary phase and outputs an amplitude in accordance with the sample data output from the ADC 32, transition (boundary) phase information output from the filter 35, and an arbitrary phase offset output from the arbitrary table 54. The memory 52 stores the amplitude output from the DI_Arb 51 in association with the arbitrary phase offset used to compute the amplitude. The maximum value detection section 53 checks amplitudes stored in the memory 52 to determine the maximum amplitude value, and causes the arbitrary table 54 to output a phase offset $\theta 0(K)$ corresponding to the maximum amplitude value. For example, the phase resolution of the arbitrary table 54 may be set in advance to be adequate for computations or may be adaptively determined in accordance with the characteristics of a transmission line used for signal transmission.

In accordance with the sample data and the boundary phase information, the control circuit 41 performs an interpolation computation to obtain the value of the received data (amplitude) while changing the phase offset, and determines a phase, which provides the maximum amplitude, as the maximum amplitude phase.

The phase providing the maximum amplitude value may be predicted to some extent from the sample data and the boundary phase. For example, it may be estimated that the phase providing the maximum amplitude value exists in the proximity of a phase intermediate between adjacent boundary phases and in the proximity of sample data having the maximum value among a plurality of sample data. Hence, three amplitudes, for example, the amplitude of a certain phase in the vicinity of the phase to be estimated, the amplitude of a phase preceding the certain phase, and the amplitude of a phase succeeding the certain phase, may be determined. Further, when the amplitude of the central phase is maximized, the central phase may be set as the maximum amplitude phase. If the amplitude of a phase on one side is great, the amplitude of a phase adjacent to the phase on the one side may be determined to determine a phase that provides the maximum value.

The control circuit 41 may operate even during signal transmission and continually set the optimum phase (background phase adjustment). Alternatively, the control circuit 41 may operate once during initialization for the start of signal transmission to set the optimum phase and subsequently retain that optimum phase.

The receiver circuit computes the received data in an arbitrary phase while changing the phase, and uses the received data in a phase that provides the greatest amplitude. The error rate may be improved or the receiver circuit may operate at an increased speed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A receiver circuit comprising:
    an analog to digital converter (ADC) configured to convert an input data signal into sample data in accordance with a clock;
    a boundary phase computation circuit configured to determine a boundary phase of the input data signal based on the sample data;
    an eye pattern computation circuit configured to:
    compute an amplitude of an eye pattern of the input data signal, based on the sample data, the boundary phase, and a phase offset from a first memory;
    determine a maximum amplitude phase of the eye pattern by computing the amplitude of the eye pattern of the input data signal, while obtaining different phase offsets from the first memory; and
    estimate, as the maximum amplitude phase, a first amplitude phase that exists in a proximity of a phase intermediate between adjacent boundary phases, compute a first amplitude corresponding to the first amplitude phase, a second amplitude corresponding to a second amplitude phase preceding the first amplitude phase, and a third amplitude corresponding to a third amplitude phase succeeding the first amplitude phase, compare the first amplitude with both of the second amplitude and the third amplitude, and determine, as the maximum amplitude phase, the first amplitude phase when the first amplitude is larger than both of the second amplitude and the third amplitude; and
    a determination circuit configured to determine a value of the input data signal in the maximum amplitude phase based on the sample data and the maximum amplitude phase.

2. The receiver circuit according to claim 1, wherein the boundary phase computation circuit, the eye pattern computation circuit and the determination circuit are included in a digital processing circuit.

3. The receiver circuit according to claim 1, wherein the eye pattern computation circuit is configured to determine the maximum amplitude phase by performing quadratic interpolation processing on the sample data.

4. The receiver circuit according to claim 1, wherein the eye pattern computation circuit is configured to determine the maximum amplitude phase by performing linear interpolation processing including an extrapolation process on the sample data.

5. The receiver circuit according to claim 1, wherein the ADC is configured to sample the input data signal at a rate of a half of a unit interval.

6. The receiver circuit according to claim 1, wherein the eye pattern computation circuit is configured to include an adder circuit to add a phase offset to the boundary phase and output the maximum amplitude phase.

7. The receiver circuit according to claim 1, further comprising:
    a second memory configured to store the computed amplitude of the eye pattern of the input data signal in association with the phase offset which is used to compute the amplitude.

8. A receiving method comprising:
    converting an input data signal into sample data in accordance with a clock from a clock generation circuit;
    determining a boundary phase of the input data signal based on the sample data;
    computing an amplitude of an eye pattern of the input data signal based on the sample data, the boundary phase, and a phase offset from a first memory;
    determining a maximum amplitude phase of the eye pattern of the input data signal by computing the amplitude, while obtaining different phase offsets from the first memory;
    estimating, as the maximum amplitude phase, a first amplitude phase that exists in a proximity of a phase intermediate between adjacent boundary phases, computing a first amplitude corresponding to the first amplitude phase, a second amplitude corresponding to a second amplitude phase preceding the first amplitude phase and a third amplitude corresponding to a third amplitude phase succeeding the first amplitude phase, comparing the first amplitude with both of the second amplitude and the third amplitude, and determining, as the maximum amplitude phase, the first amplitude phase when the first amplitude is larger than both of the second amplitude and the third amplitude; and determining a value of the input data signal in the maximum amplitude phase based on the sample data and the maximum amplitude phase.

9. The receiving method according to claim 8, wherein a digital processing circuit performs the determining of the boundary phase, the computing of the eye pattern, the determining of the maximum amplitude phase, and the determining of the value of the input data signal.

10. The receiving method according to claim 8, further comprising, performing quadratic interpolation processing on the sample data to determine the maximum amplitude phase.

11. The receiving method according to claim 8, further comprising, performing linear interpolation processing including an extrapolation process on the sample data to determine the maximum amplitude phase.

12. The receiving method according to claim 8, wherein the input data signal is converted into sample data at a rate of a half of a unit interval by an analog to digital converter (ADC).

13. The receiving method according to claim 8, further comprising, adding a phase offset to the boundary phase to output the maximum amplitude phase.

14. The receiving method according to claim 8, further comprising:

storing, in a second memory, the computed amplitude of the eye pattern of the input data signal in association with the phase offset which is used to compute the amplitude.

* * * * *